US012753365B2

(12) United States Patent
Miracle et al.

(10) Patent No.: US 12,753,365 B2
(45) Date of Patent: Oct. 6, 2026

(54) FABRIC TREATMENT COMPOSITIONS WITH ANTIOXIDANTS

(71) Applicant: The Procter & Gamble Company, Cincinnati, OH (US)

(72) Inventors: Gregory Scot Miracle, Liberty Township, OH (US); Sean N. Natoli, Liberty Township, OH (US); Mu Wang, Cincinnati, OH (US); Michael Patrick Hayes, Clarksville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1043 days.

(21) Appl. No.: 17/955,655

(22) Filed: Sep. 29, 2022

(65) Prior Publication Data

US 2023/0102749 A1 Mar. 30, 2023

Related U.S. Application Data

(60) Provisional application No. 63/280,628, filed on Nov. 18, 2021, provisional application No. 63/250,245, filed on Sep. 30, 2021.

(51) Int. Cl.

| | |
|---|---|
| ***C11D 1/72*** | (2006.01) |
| ***C11D 3/00*** | (2006.01) |
| ***C11D 3/12*** | (2006.01) |
| ***C11D 3/20*** | (2006.01) |

(52) U.S. Cl.

CPC .............. *C11D 1/72* (2013.01); *C11D 3/0084* (2013.01); *C11D 3/1206* (2013.01); *C11D 3/2003* (2013.01); *C11D 3/2096* (2013.01); *C11D 2111/12* (2024.01)

(58) Field of Classification Search

CPC ....... C11D 1/72; C11D 3/0084; C11D 3/1206; C11D 3/2003; C11D 3/2096; C11D 11/0017

See application file for complete search history.

(56) References Cited

U.S. PATENT DOCUMENTS

2005/0020457 A1* 1/2005 Rohrbach ............ C10M 173/02 508/501
2013/0123399 A1* 5/2013 Keller ............... B32B 17/10678 524/291
2021/0139816 A1 5/2021 Miracle et al.

FOREIGN PATENT DOCUMENTS

| | | | |
|---|---|---|---|
| CN | 106588663 | A | 4/2017 |
| EP | 3613837 | A1 | 2/2020 |
| JP | 2011130986 | A | 7/2011 |

OTHER PUBLICATIONS

PCT Search Report and Written Opinion for PCT/US2022/077216 dated Feb. 24, 2023; 09 pages.

* cited by examiner

*Primary Examiner* — Brian P Mruk
(74) *Attorney, Agent, or Firm* — Elizabeth A. Conklin; Kathleen Y. Carter

(57) ABSTRACT

Fabric treatment compositions that include a treatment adjunct material and certain phenol antioxidants. Process of treating fabrics that include at least one source of malodor by contacting the fabric with such fabric treatment compositions. Premix compositions that include certain phenol antioxidants, and methods of making treatment compositions that include such premixes.

19 Claims, No Drawings

FABRIC TREATMENT COMPOSITIONS WITH ANTIOXIDANTS

This application claims benefit of Provisional Ser. No. 63/280,628, filed on Nov. 18, 2021, and Provisional Ser. No. 63/250,245, filed on Sep. 30, 2021.

FIELD OF THE INVENTION

The present disclosure relates to fabric treatment compositions that include a treatment adjunct material and certain phenol antioxidants. The present disclosure also relates to processes of treating fabrics, related premixes, and related methods of making such fabric treatment compositions.

BACKGROUND OF THE INVENTION

Antioxidants are known as useful ingredients in fabric care compositions. For example, antioxidants can provide malodor control benefits by inhibiting the oxidation of soils that would otherwise release malodorous compounds.

Many known antioxidants include phenol moieties. However, it can be challenging to select a phenol antioxidant that is compatible with a variety of product forms, is efficacious, and is characterized by a suitable environmental profile.

There is a continuing need for fabric care compositions that include suitable antioxidants, as well as related methods.

SUMMARY OF THE INVENTION

The present disclosure relates to fabric treatment compositions that include a treatment adjunct material and certain phenol antioxidants.

For example, the present disclosure relates to a fabric treatment composition that includes: a treatment adjunct material, and from about 0.001% to about 5.0%, by weight of the composition, of an antioxidant according to Formula I:

(Formula I)

$$A—Q[(L)_b(C_2H_3R^2Q')_q]R^3$$

where A is selected from the group consisting of:

(Formula II)

(i)

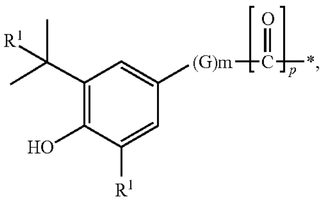

(Formula III)

(ii)

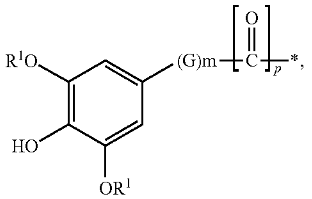

-continued (Formula IV)

(iii)

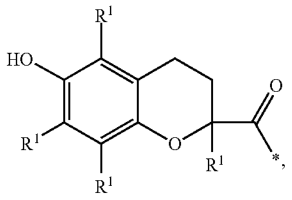

and (iv) mixtures thereof;

where each $R^1$ and $R^2$ is independently selected from —H and —$CH_3$; where the index m is 0 or 1; where G, if present, is a divalent moiety $C_nH_{2n}$, where n is 1, 2, or 3; where the index p is 0 or 1, with the proviso that when m is 0, p is 0; where Q and each Q' is independently selected from —O— and —NH—, where no more than two Q', preferably no more than one Q', is —NH—, preferably where Q and each Q' is —O—; where the index b is 0 or 1, preferably 0; where L, if present, is at the terminus of a block of the ($C_2H_3R^2Q'$) units or between two ($C_2H_3R^2Q'$) units, and is a divalent organic linking moiety with molecular weight from 15 to 300 Da, preferably —$C_6H_4O$—; where the index q is 3 to 12; where $R^3$ is selected from H, $C_1$-$C_4$ alkyl, or an independently selected A group, preferably wherein the $C_1$-$C_4$ alkyl, if present, is —$CH_3$. It may be preferred that when $R^3$ is H, no more than five of $R^2$ on any compound are H, and that when $R^3$ is $C_1$-$C_4$ alkyl or A, q is at least 4, preferably at least 5, and at least four, preferably five of $R^2$ are H, with the proviso that when the A group is Formula III and both $R^1$ of the A group are H, at least one of $R^2$ must be —$CH_3$. It may be preferred that the antioxidant is characterized by a water solubility of from about 0.1 mg/L to about 5.0 g/L, as determined according to OECD Guideline 105, preferably from about 0.25 mg/L to about 2.5 g/L, more preferably from about 0.5 mg/L to about 1.0 g/L, even more preferably from about 1.0 mg/L to about 0.5 g/L.

The present disclosure also relates to a process of treating fabrics that includes the steps of: providing a fabric, where the fabric comprises at least one source of malodor; and contacting the fabric with a fabric treatment composition as described herein.

The present disclosure also relates to a premix composition that includes from about 5% to about 99.999%, by weight of the premix composition, of a treatment adjunct material, and from about 0.001% to about 5.0%, by weight of the premix composition, of a phenol antioxidant as described herein.

The present disclosure also relates to processes for making fabric care compositions, where an antioxidant is combined with a treatment adjunct material; the antioxidant may be part of a premix composition that further includes a second treatment adjunct material.

DETAILED DESCRIPTION OF THE INVENTION

The present disclosure relates to compositions, such as fabric care composition and/or premix compositions that may be useful in such compositions, that include certain antioxidants. The antioxidants described herein are considered phenol antioxidants.

Without wishing to be bound by theory, it is believed that the presently described antioxidants are characterized by a desirable solubility profile in water, which contributes to efficient performance in fabric care applications, which are typically performed in aqueous wash liquors. While somewhat soluble, they also have a certain degree of hydrophobicity, which means that they may be attracted to hydrophobic soils that are known to be sources of malodor. Additionally, the hydrophobicity means that they can also be desirably miscible or otherwise compatible with certain other adjuncts such as perfume oils.

Further, many known phenol antioxidants are considered "hindered" phenols because they have tert-butyl groups in each position ortho to a phenolic —OH. In contrast, the antioxidants described herein may be considered "partially-hindered" because they do not have tert-butyl groups in each position ortho to a phenolic —OH. It is believed that the presently described antioxidants are characterized by a suitable environmental profile, which may make them attractive options to both manufacturers and consumers.

The phenol antioxidants, related compositions, and related methods are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric treatment composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Care Compositions

The present disclosure relates to consumer product compositions (or simply "compositions" as used herein). The compositions of the present disclosure comprise a phenol antioxidant and a treatment adjunct material, each described in more detail below.

The fabric care compositions of the present disclosure may be intended for domestic or industrial usage. Preferably, the compositions are intended for domestic use by a consumer, and are preferably consumer product compositions that are not intended for subsequent commercial manufacture or modification.

Suitable fabric care compositions include a laundry detergent composition (including a heavy-duty liquid washing detergent or a unit dose article), a fabric conditioning composition (including a liquid fabric softening and/or enhancing composition), a laundry additive, a fabric pretreat composition (including a spray, a pourable liquid, a stick, or a spray), a fabric refresher composition (including a spray), or a mixture thereof.

The fabric care compositions of the present disclosure may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, from a bottle via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

Additional components and/or features of the compositions, such as the phenol antioxidants and treatment adjunct materials, are discussed in more detail below.

Phenol Antioxidants

The compositions of the present disclosure comprise antioxidants, specifically phenol antioxidants (also simply "antioxidants" in the present disclosure). It is believed that the phenol antioxidants of the present disclosure are characterized by desirable solubility (and/or hydrophobicity), efficacy, and environmental profiles. Additionally, as described above, the phenol antioxidants of the present disclosure may be considered "partially hindered" in that they do not contain tert-butyl groups in each position ortho to the phenolic —OH. That being said, the antioxidants may contain one tert-butyl group in an ortho position.

The compositions of the present disclosure may comprise from about 0.001% to about 5.0%, by weight of the composition, of the phenol antioxidant. The composition may comprise from about 0.005% to 2.5%, preferably from about 0.01% to about 2.0%, more preferably from 0.025% to about 1.5%, of the phenol antioxidant.

The phenol antioxidant may be characterized by a structure according to Formula I:

(Formula I)

$$A—Q[(L)_b(C_2H_3R^2Q')_q]R^3$$

wherein A is selected from the group consisting of:

(Formula II)

(i)

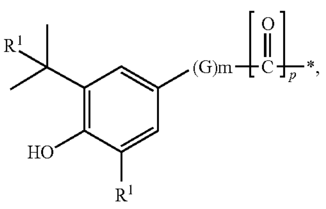

(Formula III)

(ii)

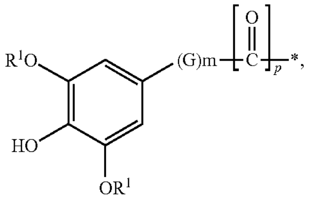

-continued (Formula IV)

(iii)

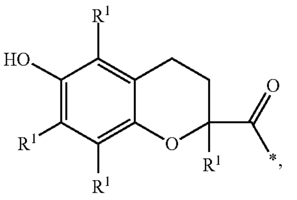

and (iv) mixtures thereof;

wherein each $R^1$ and $R^2$ is independently selected from —H and —$CH_3$; wherein the index m is 0 or 1; wherein G, if present, is a divalent moiety $C_nH_{2n}$, where n is 1, 2, or 3; wherein the index p is 0 or 1, with the proviso that when m is 0, p is 0; wherein Q and each Q' is independently selected from —O— and —NH—, wherein no more than two Q', preferably no more than one Q', is —NH—, preferably wherein Q and each Q' is —O—; wherein the index b is 0 or 1, preferably 0; wherein L, if present, may be at the terminus of a block of the ($C_2H_3R^2Q'$) units or between two ($C_2H_3R^2Q'$) units, and is a divalent organic linking moiety with molecular weight from 15 to 300 Da, preferably —$C_6H_4O$—; wherein the index q is 3 to 12; wherein $R^3$ is selected from H, $C_1$-$C_4$ alkyl, or an independently selected A group, preferably wherein the $C_1$-$C_4$ alkyl, if present, is —$CH_3$; and wherein when $R^3$ is H, no more than five of $R^2$ on any compound are H, and wherein when $R^3$ is $C_1$-$C_4$ alkyl or A, q is at least 4, preferably at least 5, and at least four, preferably at least five of $R^2$ are H, with the proviso that when the A group is Formula III and both $R^1$ of the A group are H, at least one of $R^2$ is —$CH_3$.

It may be that the phenol antioxidant's structure according to Formula I may alternatively be expressed as follows:

$$A—Q(L)_b(C_2H_3R^2Q')_qR^3$$

where all of the provisos in the preceding paragraph apply. However, it is believed that the structure that includes the brackets ("[" and "]", as shown in the structure according to Formula I in the preceding paragraph) may better indicate that the L group, if present, can be at the any of the suggested positions, including at a terminus of a block of the ($C_2H_3R^2Q'$) units and adjacent the Q group, at a terminus of a block of the ($C_2H_3R^2Q'$) units and adjacent the $R^3$ group, or between two ($C_2H_3R^2Q'$) groups.

The phenol antioxidant may be characterized by a water solubility of from about 0.1 mg/L to about 5.0 g/L, as determined according to OECD Guideline 105, preferably from about 0.25 mg/L to about 2.5 g/L, more preferably from about 0.5 mg/L to about 1.0 g/L, even more preferably from about 1.0 mg/L to about 0.5 g/L. The water solubility may be from about 0.1 mg/L, or about 0.25 mg/L, or about 0.5 mg/L, or about 1.0 mg/L to about 0.5 g/L, or about 1.0 g/L. or about 2.5 g/L, or about 5.0 g/L. It is believed that such solubilities contribute to the efficacy of the present antioxidants in fabric treatment compositions, which are typically used in aqueous treatment liquors. For example, if too soluble, the antioxidants may remain in the treatment liquor and not partition into target soils; if too insoluble, the treatment composition and/or the treatment liquor may be too physically unstable to be efficacious, and/or in the presence of surfactant, the antioxidant may be trapped in a micelle and unable to partition to a target soil.

The phenol antioxidant may, in part, be selected by its solubility in water. For example, the phenol antioxidant may be characterized by a structure according to Formula I (see above), wherein A is selected from the group consisting of Formula II, III, or IV (see above), wherein each $R^1$ and $R^2$ is independently selected from —H and —$CH_3$; wherein the index m is 0 or 1; wherein G, if present, is a divalent moiety $C_nH_{2n}$, where n is 1, 2, or 3; wherein the index p is 0 or 1, with the proviso that when m is 0, p is 0; wherein Q and each Q' is independently selected from —O— and —NH—, wherein no more than two Q', preferably no more than one Q', is —NH—, preferably wherein Q and each Q' is —O—; wherein the index b is 0 or 1, preferably 0; wherein L, if present, is a divalent organic linking moiety with molecular weight from 15 to 300 Da, preferably —$C_6H_4O$—; wherein the index q is 3 to 12; wherein $R^3$ is selected from H, $C_1$-$C_4$ alkyl, or an independently selected A group, preferably wherein the $C_1$-$C_4$ alkyl, if present, is —$CH_3$; and wherein the antioxidant is characterized by a water solubility of from about 0.1 mg/L to about 5.0 g/L, as determined according to OECD Guideline 105, preferably from about 0.25 mg/L to about 2.5 g/L, more preferably from about 0.5 mg/L to about 1.0 g/L, even more preferably from about 1.0 mg/L to about 0.5 g/L.

Typically, the q value for antioxidants according to Formula I is intended to be a value based on a weight average, as it is recognized that the antioxidant material may comprise compounds that have the indicated moiety in a distribution. However, for individual molecules/compounds, for example, the "distinct compounds" referred to below, the q value may refer to the actual number of moieties present in that particular molecule/compound. The index q may be from 3 to 12, or from 4 to 10, or from 4 to 8, or from 4 to 6, or about 5. The index q may be from 3 to 12, or from 5 to 12, or from 5 to 10, or from 6 to 10, or from 6 to 8.

For the antioxidants according to Formula I, the $R^3$ may be selected from H and a $C_1$-$C_4$ alkyl. Preferably, the $C_1$-$C_4$ alkyl, if present, is —$CH_3$. In such cases, the antioxidant comprises a single phenol group. It may be preferred that the phenol antioxidant is a low melting solid or a liquid at room temperature, as such materials tend to facilitate more convenient processing and/or handling.

For the antioxidants according to Formula I, the $R^3$ may be independently selected from an A group according to Formula II, Formula III, or Formula IV. In such cases the antioxidant comprises two phenol groups and maybe consider a dimer. For convenience of manufacturing, it may be preferred that the two A groups in such antioxidant compounds are both according to Formula II, both according to Formula III, or both according to Formula IV.

The antioxidant according to Formula I may comprise an A group according to Formula II. In such cases, the following provisos may preferably apply: (a) when both $R^1$=—$CH_3$, m=1, n=2, p=1, Q=—O—, b=0, and q=3, then at least one of $R^2$ and $R^3$ is —$CH_3$; or (b) when one $R^1$ is H, the other $R^1$ is —$CH_3$, m=p=b=0, Q=—O—, and q=3, then $R^3$=—$CH_3$, and at least one $R^2$ is —$CH_3$. When the antioxidant according to Formula I comprises an A group according to Formula II, it may be useful and preferred that both $R^1$=$CH_3$.

The antioxidant according to Formula I may comprise an A group according to Formula III.

The antioxidant according to Formula I may comprise an A group according to Formula IV.

The compositions according to the present disclosure may comprise at least three distinct compounds that are antioxidants according to Formula I. Optionally, each of the at least three distinct compounds may be characterized by a molecular weight that is different from the molecular weights of the other distinct compounds. Without wishing to be bound by theory, it believed that by including at least three distinct antioxidants, the compositions may be characterized by a broader spectrum of antioxidant benefits. Such molecular weight differences may result, for example, from different degrees of alkoxylation and/or substitution. The at least three distinct compounds may have the same A group in common. It may be preferred that the at least three distinct compounds, each of which is a compound according to Formula I, differ in the value of q, more preferably differ only in the value of q, where in such cases, "q" is taken as a number that describes the moieties in that particular compound and in such cases is not understood to be a weight average.

It may be preferred that the phenol antioxidant is characterized by at least one of the following: the antioxidant according to Formula I comprises an A group according to Formula II, wherein each $R^1$ is —$CH_3$, m is 1, Q is —O—, and b is 0; and/or the antioxidant according to Formula I comprises an A group according to Formula III, wherein both $R^1$ are the same, m is 1, Q is —O—, and b is 0; and/or the antioxidant according to Formula I comprises an A group according to Formula IV, wherein at least two, more preferably three, most preferably four $R^1$ are —$CH_3$, Q is —O—, and b is 0.

Preferably, the antioxidant comprises one of the following compounds:

a.

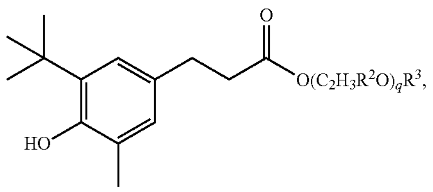

b.

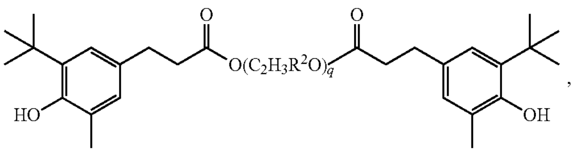

c.

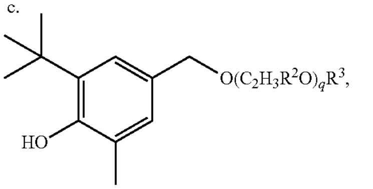

d.

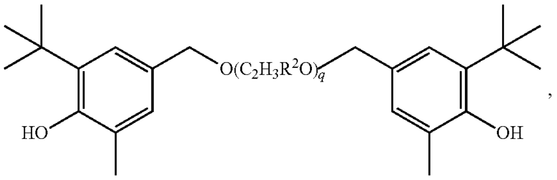

-continued e.

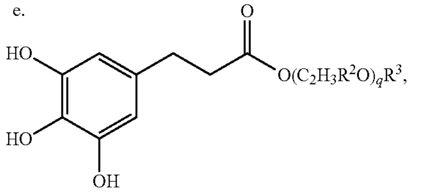

f.

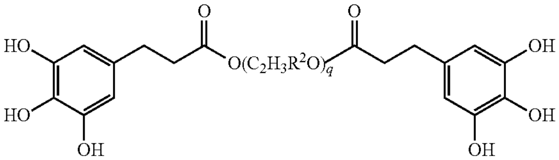
, g.

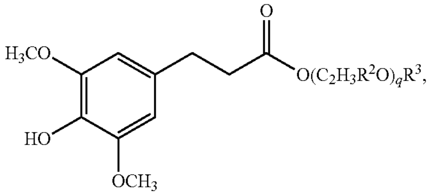

h.

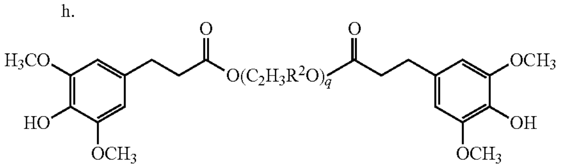
, i.

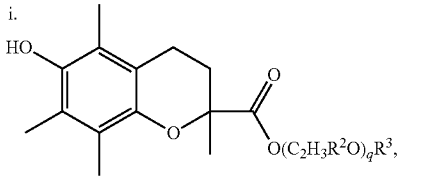
or j.

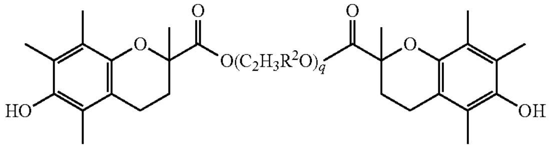
;

wherein for any of the above structures, $R^3$, if present, is —H or $CH_3$.

An advantage of the phenol antioxidants according to the present disclosure is that the solubility can conveniently be tuned to a desirable level by adjusting the structure accordingly. For example, the number and identity (e.g., based on $R^2$) of the alkoxy groups, as well as the terminal group ($R^3$), can be selected to influence the solubility and/or the hydrophobicity. For example, it may be preferred that q is equal to a value from about 4 to about 6, preferably about 5. Selection of the $R^2$ moieties can also help to tune the solubility. For example, if $R^3$ is H, then it may be preferred for relatively more $R^2$ moieties to be —$CH_3$, in order to add hydrophobicity. On the other hand, if $R^3$ is —$CH_3$, then relatively more $R^2$ moieties can be H. When $R^3$ is an A group, it may be preferred for q=4-12, preferably 5-10, more preferably 5-8, which may help to tune the solubility to a desirable level.

The phenol antioxidants of the present disclosure may be characterized by a log D value, which relates to a compound's octanol/water partitioning coefficient at pH 7. Log D values are determined according to the method provided in the Test Method section below. The phenol antioxidant may be characterized by a log D value at pH 7 equal to or greater than 1.50, preferably equal to or greater than 3.50. Relatively greater log D values indicate relatively greater hydrophobicity, and it is believed that relatively hydrophobic antioxidants are more likely to partition into hydrophobic soils (such as sebum soils), where they are more likely to impact autoxidation of those soils post-treatment.

Samples of the phenol antioxidants of the present disclosure may be prepared using standard organic synthesis methods well known to those of ordinary skill in the art. Compounds with general formula $A\text{-}Q[(L)_b(C_2H_3R^2Q')_q]R^3$ may have a value of q that represents a discrete species, or the value q may represent a weight average number of a distribution of molecules derived from a polymerization reaction. These antioxidants may be made in a straightforward manner. For example, a simple lower alkyl starting ester of formula $A\text{-}OCH_3$ may be transesterified with a material of formula $HQ[(L)_b(C_2H_3R^2Q')_q]R^3$ (where Q and all Q' are —O—) under acidic conditions with removal of methanol. When $R^3$ is lower alkyl ($C_1$-$C_4$ alkyl), approximately one equivalent of $HO[(L)_b(C_2H_3R^2O)_q]R^3$ may be used to arrive at the target monoester. Starting with $HO[(L)_b(C_2H_3R^2O)_q]H$, a two-fold excess of starting ester $A\text{-}OCH_3$ is used to prepare the bis-ester where $R^3$ is A. To arrive at a monoester where $R^3$ is H, either a large excess of $HO[(L)_b(C_2H_3R^2O)_q]H$ is reacted with $A\text{-}OCH_3$ to obtain a mixture with primarily monoester containing a small amount of bis-ester (easily separable by chromatography), or a mono-protected form of the diol such as $HO[(L)_b(C_2H_3R^2O)_q]CH_2C_6H_5$ is reacted with approximately one equivalent of $A\text{-}OCH_3$ to obtain a monoester after which the protecting group is removed via hydrogenation.

By way of further example, where A groups have the index p=0, the starting alcohol A-QH may be alkoxylated with the appropriate equivalents of ethylene oxide, propylene oxide, or mixtures thereof, and the product optionally capped with a lower alkyl group (e.g., using a $C_1$ to $C_4$ tosylate). Alternatively, the capped or uncapped alcohol $HO[(L)_b(C_2H_3R^2O)_q]R^3$ (which when $R^3$ is not H may itself be prepared from alkoxylation of the alcohol $HOR^3$ with the appropriate equivalents of ethylene oxide, propylene oxide, or mixtures thereof) may be converted to an anionic species and reacted with A-Cl or A-Br where the index m is 1, capped alcohols leading to antioxidants with a single A group, and uncapped alcohol being able to give rise to antioxidants with two A groups.

Treatment Adjunct Material

The fabric care compositions of the present disclosure comprise a treatment adjunct material in addition to the phenol antioxidants described above. The treatment adjunct material may provide a benefit in the intended end-use of a composition, or it may be a processing and/or stability aid.

Suitable treatment adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents (including hueing dyes and/or leuco compositions), aesthetic dyes, perfumes, perfume delivery systems, structure elasticizing agents, carriers, hydrotropes, processing aids, anti-agglomeration agents, coatings, formaldehyde scavengers, and/or pigments.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, perfumes, perfume delivery systems, structure elasticizing agents, fabric softeners, carriers, hydrotropes, processing aids, structurants, anti-agglomeration agents, coatings, formaldehyde scavengers, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

The fabric treatment composition may comprise an additional antioxidant, such as a hindered phenol antioxidant and/or a diaryl amine antioxidant.

The fabric treatment composition may comprise a chelating agent. The chelating agent may be selected from the group consisting of phosphonates, aminocarboxylates, amino phosphonates, polyfunctionally-substituted aromatic chelating agents, and mixtures thereof. Preferred chelating agents are biodegradeable. Suitable and preferred chelating agents include S,S-EDDS, GLDA, and/or MGDA.

Premix Compositions

The present disclosure also relates to premix compositions that that may be suitable for incorporation into treatment compositions, such as fabric care treatment compositions. Premixes can be advantageous when an adjunct material is manufactured at one location and incorporated into a product composition at another.

Suitable premix compositions comprise a treatment adjunct material and from about 0.001% to about 5.0%, by weight of the premix composition, of a phenol antioxidant. Suitable treatment adjunct materials and phenol antioxidants according to the present disclosure are described above.

In a premix, the treatment adjunct material may be present at a relatively higher level than would be expected in a fabric care composition, for example, present in the premix at a level that is at least 2×, or at least 5×, or at least 10× of the level of the final fabric care composition. The treatment adjunct material may be present in the premix composition at a level of from about 5% to about 99.999%, preferably from about 10% to about 99.99%, more preferably from about 25% to about 99.9%, even more preferably from about 50% to about 99.9%, by weight of the premix composition.

The treatment adjunct material may be any of those described above that are suitable for inclusion in such a premix. Preferably, the treatment adjunct material may comprise perfume raw materials. It is expected that the antioxidants and perfume raw materials will both provide desirable freshness/anti-malodor benefits, and so it may be preferred by the manufacturer to provide them in a single premix. Premixes that comprise perfume raw materials may be in the form of an emulsion, such as an oil-in-water emulsion or a water-in-oil emulsion, which may facilitate the inclusion of the premix into certain product forms, such as aqueous liquids. In certain cases, it may be preferred that the premix has relatively low amounts of water, or even is substantially free of water, for example to save on transportation costs or to give the product manufacturer formulation flexibility.

The premix is preferably a liquid premix composition. The treatment adjunct material may be in the form of a liquid, for example perfume raw materials in the form of a liquid. The premix composition may comprise a carrier material, such as water, organic solvent, or a mixture thereof.

The premix composition may include a relatively limited number of ingredients, for example less than what would be considered a "full" product formulation. Excluding the antioxidant material, the premix composition may comprise no more than ten, preferably no more than eight, preferably no more than six, preferably no more than four, preferably no more than three, or even no more than two types of materials. In such cases, materials that are similar in chemistry and/or function are considered to be one "type of material." For example, a mixture of various perfume raw materials, regardless of the number of compounds present or what type of olfactory character is associated with each, would be considered one type of material, as they all perform the function of providing fragrance/freshness to a product.

Methods of Making

The present disclosure relates to processes for making any of the compositions described herein. The process of making a fabric care composition and/or a premix composition may comprise the step of combining a phenol antioxidant as described herein with a treatment adjunct material as described herein.

The present disclosure relates to a process of making a fabric care composition, the process comprising combining an antioxidant as described herein with a treatment adjunct material. The antioxidant may be part of a premix composition prior to being combined with the treatment adjunct material. The treatment adjunct material may be a first treatment adjunct material that is part of a base composition, and the premix composition may further comprise a second treatment adjunct material that is different from the first adjunct material.

For example, a perfume premix (which contains an antioxidant according to the present disclosure, as well as perfume raw materials) may be added to a base composition that comprises anionic surfactant (e.g., to make a detergent) or a conditioning agent such as an ester quat (e.g., to make a fabric conditioner).

The compositions of the present disclosure can be formulated into any suitable form and prepared by any process chosen by the formulator. The antioxidants and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

Process of Treating a Fabric

The present disclosure further relates to processes of treating a fabric with a composition according to the present disclosure. Such processes may provide malodor control, cleaning, conditioning, and/or freshening benefits. Suitable fabrics may include including clothing, towels, linens, or upholstery.

The process may include a step of contacting a fabric with a composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The fabric may be optionally dried by drying passively and/or via an active method such as a laundry dryer.

The process of treating fabrics may comprise the steps of: providing a fabric, wherein the fabric comprises at least one source of malodor; and contacting the fabric with the fabric treatment composition as described herein. The process of treating fabrics may comprise the steps of: providing a fabric, wherein the fabric comprises at least one source of malodor; and contacting the fabric with a treatment liquor that comprises a (partially hindered) antioxidant as described herein.

Sources of malodor may include soils, such as sebum soils or greasy soils. Without being bound by theory, it is believed that such soils may oxidize and release malodorous compounds; the antioxidants of the present disclosure are believed to inhibit such oxidation and release.

The fabric treatment composition may be diluted with water to form a treatment liquor. Preferably, the treatment liquor further comprises a metal ion. The metal ion may comprise copper ions, iron ions, manganese ions, or mixtures thereof. The metal ion may comprise $Cu^{2+}$ ions. The metal ion may be introduced to the wash liquor by being present on the fabric prior to being contacted with the wash liquor, being present in the water used to make the wash liquor, or a combination thereof. Without wishing to be bound by theory, it is believed that copper ions (as well as other transition ions that are redox active, such as iron and manganese) can serve as adventitious initiators of autoxidation, generating reactive radical species that begin the chain of autoxidation events. The autoxidation of unsaturated compounds in sebum, for example, can lead to the release of malodorous molecular fragments of larger molecules. Thus, it is believed that the antioxidants of the present disclosure can be particularly useful when a treatment liquor comprises metal ions such as $Cu^{2+}$ ions.

The wash liquor may comprise from about 0.1 ppm to about 100 ppm total of the phenol antioxidant. In the treatment process of the present disclosure, at least one of the following may be true: the fabrics are washed in the wash liquor at a temperature of between 10° C. and 35° C.; and/or the wash operation (e.g., the wash cycle of an automatic washing machine, not including rinse cycle(s)) takes between about 5 minutes and about 30 minutes.

In the treatment process of the present disclosure, the wash liquor may be prepared by diluting the fabric treatment composition in water by a factor of between 100-fold and 3000-fold, preferably between 300-fold and 900-fold. Additionally, the process may further comprise the steps of: in a wash operation, washing the fabrics in the wash liquor using an automatic wash operation, a manual wash operation or a mixture thereof; separating the fabrics and the wash liquor from one another; and drying the fabrics.

For purposes of the present invention, washing includes but is not limited to, scrubbing, and mechanical agitation. The fabric may comprise most any fabric capable of being laundered or treated in normal consumer use conditions.

Treatment liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C., and the water-to-fabric weight ratio is typically from about 1:1 to about 30:1.

Test Methods

It is understood that the test methods disclosed in the Test Methods section of the present application should be used to determine the respective values of the parameters of Applicant's claimed subject matter as claimed and described herein.

Water Solubility Test Method

Water solubility, measured in milligrams per liter (mg/L) or grams per liter (g/L), is determined according to OECD Guideline 105, as adopted Jul. 27, 1995. The method is described below.

A. Initial Considerations

The water solubility of a substance can be considerably affected by the presence of impurities. This guideline addresses the determination of the solubility in water of essentially pure substances which are stable in water and not volatile. Before determining water solubility, it is useful to have some preliminary information on the substance, like structural formula, vapour pressure, dissociation constant and hydrolysis as a function of pH.

Two methods, the column elution method and the flask method which cover respectively solubilities below and above $10^{-2}$ g/l are described in this guideline. A simple preliminary test is also described. It allows to determine approximately the appropriate amount of sample to be used in the final test, as well as the time necessary to achieve saturation.

B. Definitions and Units

The water solubility of a substance is the saturation mass concentration of the substance in water at a given temperature.

Water solubility is expressed in mass of solute per volume of solution. The SI unit is $kg/m^3$ but g/l is commonly used.

C. Reference Substance

Reference substances do not need to be employed when investigating a substance.

D. Description of the Method

1. Test Conditions

The test is run at 20±0.5° C. The temperature should be kept constant in all relevant parts of the equipment.

2. Preliminary Test

In a stepwise procedure, increasing volumes of water are added at room temperature to approximately 0.1 g of the sample (solid substances must be pulverized) in a 10 ml glass-stoppered measuring cylinder. After each addition of an amount of water, the mixture is shaken for 10 minutes and is visually checked for any undissolved parts of the sample. If, after addition of 10 ml of water, the sample or parts of it remain undissolved, the experiment is continued in a 100 ml measuring cylinder. The approximate solubility is given in Table 1 below under that volume of water in which complete dissolution of the sample occurs. When the solubility is low, a long time may be required to dissolve a substance and at least 24 hours should be allowed. If, after 24 hours, the substance is still not dissolved, more time (up to 96 hours) should be allowed or further dilution should be attempted to ascertain whether the column elution method or flask method should be used.

TABLE 1

| | mL of water for 0.1 g soluble | | | | | | |
|---|---|---|---|---|---|---|---|
| | 0.1 | 0.5 | 1 | 2 | 10 | 100 | >100 |
| Approximate solubility in g/L | >1000 | 1000 to 200 | 200 to 100 | 100 to 50 | 50 to 10 | 10 to 1 | <1 |

3. Column Elution Method a. Principle

This method is based on the elution of a test substance with water from a micro-column which is charged with an inert support material, previously coated with an excess of the test substance (NF T 20-045 (AFNOR) (September 1985)—Chemical products for industrial use—Determination of water solubility of solids and liquids with low solubility—Column elution method). The water solubility is given by the mass concentration of the eluate when this has reached a plateau as a function of time.

b. Apparatus

The apparatus consists of a microcolumn, maintained at constant temperature. It is connected either to a recirculating pump or to a levelling vessel. The microcolumn contains an inert support held in place by a small plug of glasswool which also serves to filter out particles. Possible materials which can be employed for the support are glass beads, diatomaceous earth, or other inert materials. To the extent that figures of the apparati are useful, they may be found in OECD Guideline 105, as adopted Jul. 27, 1995.

The microcolumn may be suitable for the set-up with recirculating pump. It can have a head space providing for five bed volumes (discarded at the start of the experiment) and the volume of five samples (withdrawn for analysis during the experiment). Alternatively, the size can be reduced if water can be added to the system during the experiment to replace the initial five bed volumes removed with impurities. The column is connected with tubing made of an inert material to the recirculating pump, capable of delivering approximately 25 ml/h. The recirculating pump can be, for example, a peristaltic or membrane pump. Care must be taken that no contamination and/or adsorption occurs with the tube material.

When using a levelling vessel, the microcolumn is fitted with a one way stopcock. The connection to the levelling vessel consists of a ground glass joint and tubing made of an inert material. The flow rate from the levelling vessel should be approximately 25 ml/h.

c. Loading of the Support

Approximately 600 mg of support material is transferred to a 50 ml round-bottom flask. A suitable amount of test substance is dissolved in a volatile solvent of analytical reagent quality and an appropriate amount of this solution is added to the support material. The solvent is completely evaporated, e.g. using a rotary evaporator, as otherwise water saturation of the support will not be achieved during the elution step because of partitioning on the surface. The loaded support material is soaked for two hours in approximately 5 ml of water and the suspension is poured into the microcolumn. Alternatively, dry loaded support material may be poured into the water-filled microcolumn and two hours are allowed for equilibrating.

The loading of the support material may cause problems, leading to erroneous results, e.g. when the test substance is deposited as an oil. These problems should be examined and the details reported.

d. Procedure Using a Recirculating Pump

The flow through the column is started. It is recommended that a flow rate of approximately 25 ml/h, corresponding to 10 bed volumes per hour for the column described, be used. At least the first five bed volumes are discarded to remove water soluble impurities. Following this, the pump is allowed to run until equilibrium is established, as defined by five successive samples whose concentrations do not differ by more than ±30% in a random fashion. These samples should be separated from each other by time intervals corresponding to the passage of at least ten bed volumes. Depending on the analytical method used, it may be preferable to establish a concentration/time curve to show that equilibrium is reached.

e. Procedure Using a Levelling Vessel

Successive eluate fractions should be collected and analyzed by the chosen method. Fractions from the middle eluate range, where the concentrations are constant within ±30% in at least five consecutive fractions, are used to determine the solubility.

f. Notes Applicable to Both Procedures

Double distilled water is the preferred eluent. Deionized water with a resistivity above 10 megohms/cm and a total organic carbon content below 0.01% can also be used.

Under both procedures, a second run is performed at half the flow rate of the first. If the results of the two runs are in agreement, the test is satisfactory. If the measured solubility is higher with the lower flow rate, then the halving of the flow rate must continue until two successive runs give the same solubility.

Under both procedures, the fractions should be checked for the presence of colloidal matter by examination of the Tyndall effect. The presence of particles invalidates the test and the test should be repeated after improvement of the filtering action of the column.

The pH of each sample should be measured, preferably by using special indicator strips.

4. Flask Method a. Principle

The substance (solids must be pulverized) is dissolved in water at a temperature somewhat above the test temperature. When saturation is achieved, the mixture is cooled and kept at the test temperature. Alternatively, and if it is assured by appropriate sampling that the saturation equilibrium is reached, the measurement can be performed directly at the test temperature. Subsequently, the mass concentration of the substance in the aqueous solution, which must not contain any undissolved particles, is determined by a suitable analytical method (NF T 20-046, AFNOR, September 1985. Chemical products for industrial use—Determination of water solubility of solids and liquids with high solubility—Flask method).

b. Apparatus

The following material may be used:

- normal laboratory glassware and instrumentation;
- a device for the agitation of solutions under controlled, constant temperature;
- if required for emulsions, a centrifuge (preferably thermostated); and
- analytical equipment.

c. Procedure

The quantity of test substance necessary to saturate the desired volume of water is estimated from the preliminary test. About five times that quantity is weighed into each of three glass vessels fitted with glass stoppers (e.g. centrifuge tubes, flasks). A volume of water, chosen in function of the analytical method and solubility range, is added to each vessel. The vessels are tightly stoppered and then agitated at 30° C. A shaking or stirring device capable of operating at constant temperature should be used, e.g. magnetic stirring in a thermostated water bath. After one day, one of the vessels is equilibrated for 24 hours at the test temperature with occasional shaking. The contents of the vessel are then centrifuged at the test temperature and the concentration of the test substance in the clear aqueous phase is determined by a suitable analytical method. The other two flasks are treated similarly after initial equilibration at 30° C. for two and three days respectively. If the concentrations measured in at least the two last vessels do not differ by more than 15%, the test is satisfactory. If the results from vessels 1, 2 and 3 show a tendency of increasing values, the whole test should be repeated using longer equilibration times.

The test can also be performed without preincubation at 30° C. In order to estimate the rate of establishment of the saturation equilibrium, samples are taken until the stirring time no longer influences the concentrations measured.

The pH of each sample should be measured, preferably by using special indicator strips.

d. Analytical Determination

A substance-specific method is preferred since small amounts of soluble impurities can cause large errors in the measured solubility. Examples of such methods are: gas or liquid chromatography, titration, photometry, voltammetry.

E. Data and Reporting

1. Data a. Column Elution Method

For each run, the mean value and standard deviation from at least five consecutive samples taken from the saturation plateau should be calculated. The mean values obtained from two tests with different flows should not differ by more than 30%.

b. Flask Method

The individual results from each of the three flasks, which should not differ by more than 15%, are averaged.

2. Test Report a. Column Elution Method

The test report may include the following information:

- the results of the preliminary test;
- chemical identity and impurities (preliminary purification step, if any);
- the concentrations, flow rates and pH for each sample;
- the means and standard deviations from at least five samples from the saturation plateau of each run;
- the average of at least two successive runs;
- the temperature of the water during the saturation process;
- the method of analysis;
- the nature of the support material;
- loading of the support material;
- solvent used;
- evidence of any chemical instability of the substance during the test;
- all information relevant for the interpretation of the results, in particular with regard to impurities and physical state of the substance.

b. Flask Method

The test report may include the following information:

- the results of the preliminary test;
- chemical identity and impurities (preliminary purification step, if any);
- the individual analytical determinations and the average where more than one value was determined for each flask;
- the pH of each sample;
- the average of the values for different flasks which were in agreement;
- the test temperature;
- the analytical method;
- evidence of any chemical instability of the substance during the test;
- all information relevant for the interpretation of the results, in particular with regard to impurities and physical state of the substance.

Malodor Reduction Test Method

The following method is used to test the malodor reduction benefits of a composition.

A. Preparation of 75 grams Malodor Marker

Fatty acids and malodor markers are added into 100 ml glass gar with Teflon-lined cap according to Table A and mixed well using a vortex.

TABLE A

| Malodor marker composition | | | |
|---|---|---|---|
| Material | CAS # | % Composition | Weight needed (g) |
| Iso Valeric acid | 503-74-2 | 12.00 | 9.0 |
| Undecanal | 112-44-7 | 0.20 | 0.15 |
| Undecanoic Acid | 112-37-8 | 62.80 | 47.1 |
| Skatole | 83-34-1 | 1.00 | 0.75 |
| Decanoic Acid | 334-48-5 | 22.00 | 16.5 |
| Ethyl undecanoate | 627-90-7 | 2.00 | 1.5 |

B. Preparation of Body Soil Malodor Composition

Provided the specified amount of each material according to Table B into a 200 mL glass jar with Teflon lined cap. Artificial body soil (ABS) is commercially available by Accurate Product Development; 2028 Bohlke Blvd, Fairfield, OH 45014.

TABLE B

| Body soil malodor composition | |
|---|---|
| Material | Weight (g) |
| Malodor marker (from Table A) | 17.1 |
| Artificial Body Soil (ABS) | 15.8 |
| Di-propylene glycol monomethyl ether (CAS: 34590-94-8) | 105 |
| Squalene (CAS # 111-02-4) | 15.8 |

C. Preparation of Malodor Test Fabrics

Sixteen malodor test fabrics per wash load are prepared by applying 300 μl of Body soil malodor composition described in Table B to de-sized 2×5 inch white polycotton 50/50 (PCW50/50) swatches. 48 grams of liquid detergent to be tested (see, e.g., Example 1, Table 1, below) is added to Duet 9200 washing appliance set to Normal cycle; 77° F. wash cycle followed by a 60° F. rinse cycle. Cincinnati, OH, USA Municipal tap water is used, which contains an ambient level of copper, due to copper piping systems, for example. Malodor test fabrics are washed in 7 gpg wash water with 3.9 kg, 50×50 cm clean cotton and poly-cotton ballast then dried in a Maytag double stack tumble drier set to low for 20 minutes. The dried fabrics are placed in a mylar bag and sealed for 24 hours.

D. Analytical Detection of Malodor on Fabric

The malodor reduction using ABS/Squalene malodor sensors are quantitatively determined by Gas Chromatography Mass Spectroscopy using an Agilent gas chromatograph 7890B equipped with a mass selective detector (5977B), a Chemstation quantitation package and a Gerstel multi-purpose sampler equipped with a solid phase micro-extraction (SPME) probe. Calibration standards of 6-Methyl-5-hepten-2-one (CAS 110-93-0), Trans-2-heptenal (18829-55-5) and 3-methyl-2-Butenal (107-86-8) are prepared by dissolving a known weight of these materials in light mineral oil (CAS 8020-83-5) (each material available from Sigma Aldrich). Fabrics are cut into uniform 2 inch by 2.5 inch pieces and placed in 10 mL headspace crimp vials. Vials are equilibrated greater than 12 hours before analysis. The following settings are used in the auto sampler: 80 C incubation temperature, 90 min incubation time, VT32-10 sample tray type, 22 mm vial penetration, 20 min extraction time, 54 mm injection penetration and 300 s desorption time. The following settings are used for the Front Split/Splitless inlet helium: split mode, 250 C temperature, 12 psi pressure, 79.5 mL/min total flow, 3 mL/min septum purge flow, 50:1 split ratio and 22.5 min GC run time. The follow settings are used in the oven: 40 C initial temperature, 12 C/min heating program, 250 C temperature and 5 min hold time. Based on the partition coefficients (K at 80 C) of each component, the total nMol/L liter of 6-Methyl-5-hepten-2-one (K=3353), Trans-2-heptenal (K=3434), and 3-methyl-2-Butenal (K=1119) are calculated.

These values of these three measurements (in nmoles/L) are added together to provide the Total ABS/Squalene Markers (nmoles/L) for a given test leg.

E. % Malodor Reduction Oxidation Products Calculations

The % Malodor Reduction Oxidation Products is provided as a percentage comparing the reduction of the amount of selected malodor markers as provided by the test composition compared to the (nil-antioxidant) reference composition. The value is determined as follows:

$$\% \text{ Reduction Oxidation Products}=(\text{Markers}_{ref}-\text{Markers}_{test})\times 100/\text{Markers}_{ref}$$

Values for $\text{Markers}_{ref}$ and $\text{Markers}_{test}$ are defined as follows:

$\text{Markers}_{ref}$=Total ABS/Squalene Markers (nmoles/L) of the fabrics washed with the formulation without antioxidant (e.g., the reference or control formulation)

$\text{Markers}_{test}$=Total ABS/Squalene Markers (nmoles/L) of the fabrics washed with the formulation with the tested antioxidant As the measured oxidation products are typically considered malodorous, it is believed that the greater the % reduction of oxidation products provided by a composition, the less malodorous the treated fabrics are likely to be. Therefore, greater values of % Malodor Reduction Oxidation Products are typically preferred. The compositions and processes of the present disclosure may provide a % Malodor Reduction Oxidation Products value of at least about 10%, or at least about 20%, or at least about 30%, or at least about 40%, or at least about 50%, or at least about 60%, or at least about 70%, or at least about 80%.

Malodor reduction may also be reported as the difference between $\text{Markers}_{ref}$ and $\text{Markers}_{test}$, thereby showing an absolute difference (e.g., Delta ABS/Squalene Oxidation).

Test Method for Determining "log D" Values (the Logarithm of the Octanol/Water Partition Coefficient at pH 7)

The value of the log of the Octanol/Water Partition Coefficient at pH 7.00 (log D) is determined for each antioxidant. The unit-less value for log D at pH 7 for a known antioxidant is obtained from Chemical Abstracts Service (CAS, Columbus, Ohio, USA) if available. CAS provides values calculated using Advanced Chemistry Development (ACD/Labs) Software V11.02 (© 1994-2019 ACD/Labs). If the value is not available from CAS, the value is determined using ACD software (version 14.02 (Linux) available from Advanced Chemistry Development Inc., ACD/Labs, Toronto, Canada) employing the default log P Consenses and pKa Classic algorithms for the log D calculation.

Antioxidants of the present invention have a log D at pH 7.00 greater than or equal to one or more claimed values (CV). If the log D is not listed for an antioxidant compound of interest from information available from Chemical Abstracts Service (CAS, Columbus, Ohio, USA), it may be calculated directly using the ACD software.

If the value of the calculated log D at pH 7, obtained from CAS if available, or calculated with the software, is less than CV−0.50, or is not listed and is determined via calculation using ACD software to have a log D at pH 7 less than CV−0.50, no measurement of the experimental value is required. If the value of the calculated log D at pH 7 is already listed as being equal to or greater than CV−0.50 and less than or equal to CV+0.50, or is not listed and is determined via calculation using ACD software to have a log D at pH 7 equal to or greater than CV−0.50 and less than or equal to CV+0.50, then an experimental determination of the value must be performed to arrive at the value for the purposes of this invention. In the present invention, the measure of octanol-water partition coefficient is to be accomplished according to OECD Test No. 117: Partition Coefficient (n-octanol/water), HPLC Method. The method is available from the OECD iLibrary (https://www.oecd-ilibrary.org/), the online library of the Organisation for Economic Cooperation and Development (OECD).

Reverse phase HPLC is performed on analytical columns packed with a solid phase containing long hydrocarbon chains chemically bound onto silica. The chemicals are retained in the column in proportion to their hydrocarbon-water partition coefficient, with hydrophilic chemicals eluted first and lipophilic chemicals last. The HPLC method covers log Pow in the range of 0 to 6, but it can be expanded to cover the log Pow range between 6 and 10 in exceptional cases. The HPLC operation mode is isocratic. The test substance is injected in the smallest detectable quantities in the column. The retention time is determined in duplicate. The partition coefficient of the test substance is obtained by interpolation of the calculated capacity factor on the calibration graph. For very low and very high partition coefficients extrapolation is necessary.

The pH of the eluent is critical for ionizable substances. For the purposes of the present invention, buffering of the eluant to pH 7.00±0.05 is required when performing the OECD 117 test. The value obtained is taken to be the log D at pH 7 for the material of interest.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric treatment composition comprising:

a treatment adjunct material, and from about 0.001% to about 5.0%, by weight of the composition, of an antioxidant according to Formula I:

(Formula I)

$$A{-}Q[(L)_b(C_2H_3R^2Q')_q]R^3$$

wherein A is selected from the group consisting of:

(Formula II)

(i)

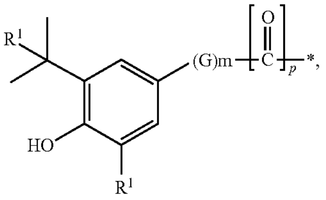

(Formula III)

(ii)

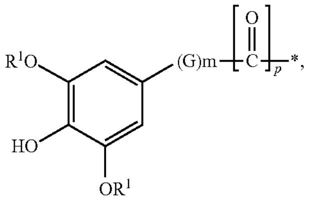

(Formula IV)

(iii)

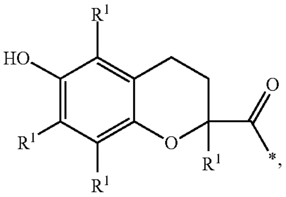

and (iv) mixtures thereof;

wherein each $R^1$ and $R^2$ is independently selected from —H and —$CH_3$;

wherein the index m is 0 or 1;

wherein G, if present, is a divalent moiety $C_nH_{2n}$, where n is 1, 2, or 3;

wherein the index p is 0 or 1, with the proviso that when m is 0, p is 0;

wherein Q and each Q' is independently selected from —O— and —NH—, wherein no more than two Q' is —NH—;

wherein the index b is 0 or 1;

wherein L, if present, is at the terminus of a block of the ($C_2H_3R^2Q'$) units or between two ($C_2H_3R^2Q'$) units, and is a divalent organic linking moiety with molecular weight from 15 to 300 Da;

wherein the index q is 3 to 12;

wherein $R^3$ is selected from H, $C_1$-$C_4$ alkyl, or an independently selected A group; and wherein when $R^3$ is H, no more than five of $R^2$ on any compound are H, and wherein when $R^3$ is $C_1$-$C_4$ alkyl or A, q is at least 4, and at least four of $R^2$ are H, with the proviso that when the A group is Formula III and both $R^1$ of the A group are H, at least one of $R^2$ must be —$CH_3$;

wherein the antioxidant according to Formula I comprises an A group according to Formula III.

2. A fabric treatment composition according to claim 1, wherein the antioxidant is characterized by a water solubility of from about 0.1 mg/L to about 5.0 g/L, as determined according to OECD Guideline 105.

3. The fabric treatment composition according to claim 1, wherein $R^3$ is selected from H and a $C_1$-$C_4$ alkyl.

4. The fabric treatment composition according to claim 1, wherein the antioxidant according to Formula I comprises an A group according to Formula II, optionally with the following provisos:

a) when both $R^1$=—$CH_3$, m=1, n=2, p=1, Q=—O—, b=0, and q=3, then at least one of $R^2$ and $R^3$ is —$CH_3$; or b) when one $R^1$ is H, the other R is —$CH_3$, m=p=b=0, Q=—O—, and q=3, then $R^3$=—$CH_3$, and at least one $R^2$ is —$CH_3$.

5. The fabric treatment composition according to claim 1 wherein at least one of the following is true:

the antioxidant according to Formula I comprises an A group according to Formula II, wherein $R^1$ is —$CH_3$, m is 1, Q is —O—, and b is 0; and/or the antioxidant according to Formula I comprises an A group according to Formula III, wherein both $R^1$ are the same, m is 1, Q is —O—, and b is 0; and/or the antioxidant according to Formula I comprises an A group according to Formula IV, wherein at least two $R^1$ are —$CH_3$, Q is —O—, and b is 0.

6. The fabric treatment composition according to claim 1, wherein the antioxidant comprises one of the following compounds:

a.

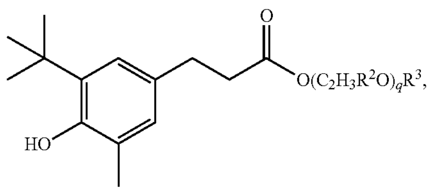

b.

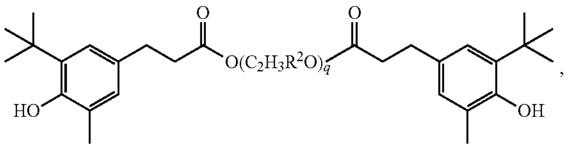

-continued c.

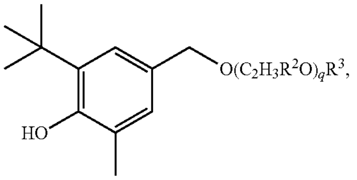

d.

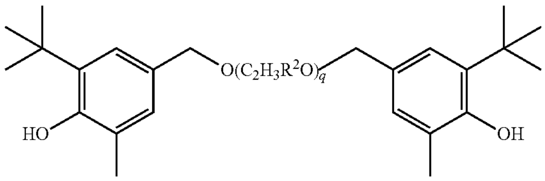

, e.

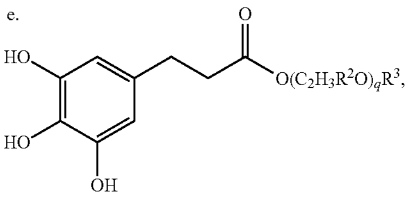

f.

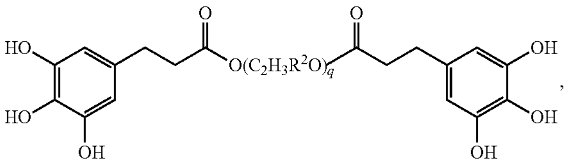

, g.

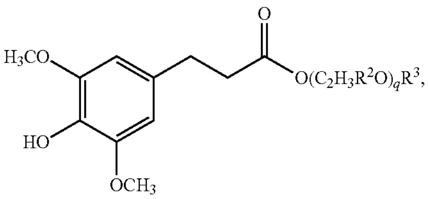

h.

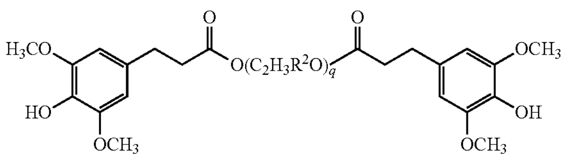

, i.

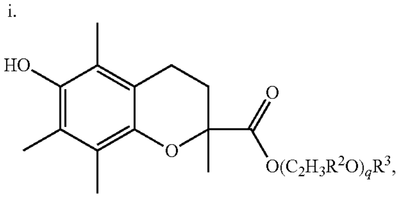

or

-continued j.

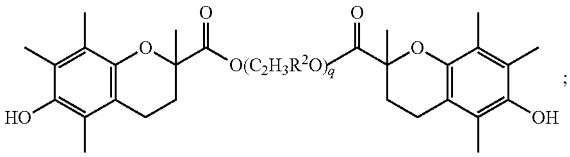

;

wherein for any of the above structures, $R^3$ is —H or $CH_3$.

7. The fabric treatment composition according to claim 1, wherein the composition comprises from about 0.005% to 2.5%, by weight of the composition, of the antioxidant.

8. The fabric treatment composition according to claim 1, wherein the treatment adjunct material is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

9. The fabric treatment composition according to claim 1, wherein the fabric treatment composition further comprises a chelant, wherein the chelant is selected from the group consisting of phosphonates, aminocarboxylates, amino phosphonates, polyfunctionally-substituted aromatic chelating agents, and mixtures thereof.

10. The fabric treatment composition according to claim 1, wherein the fabric treatment composition is a laundry detergent composition, a fabric conditioning composition, a laundry additive, a fabric pre-treat composition, a fabric refresher composition, or a mixture thereof.

11. The fabric treatment composition according to claim 1, wherein the fabric treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

12. A process of treating fabrics comprising the steps of:

providing a fabric, wherein the fabric comprises at least one source of malodor;

contacting the fabric with the fabric treatment composition according to claim 1.

13. The process according to claim 12, wherein the fabric treatment composition is diluted with water to form a treatment liquor, wherein the treatment liquor further comprises a metal ion.

14. The process according to claim 13, wherein the metal ion is introduced to the wash liquor by being present on the fabric prior to being contacted with the wash liquor, being present in the water used to make the wash liquor, or a combination thereof.

15. The process according to claim 13, wherein the treatment liquor comprises from 0.1 ppm to 100 ppm total of the antioxidant.

16. A process of making a fabric care composition, the process comprising combining an antioxidant with a treatment adjunct material, wherein the antioxidant is a phenol antioxidant according to Formula I:

(Formula I)

$$A—Q[(L)_b(C_2H_3R^2Q')_q]R^3$$

wherein A is selected from the group consisting of:

(Formula II)

(i)

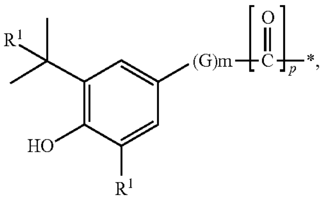

(Formula III)

(ii)

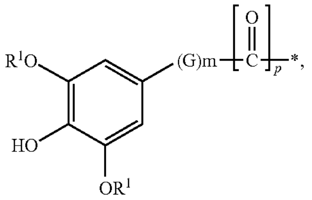

(Formula IV)

(iii)

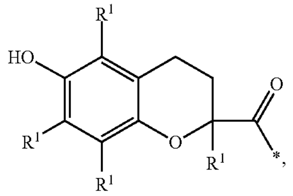

and (iv) mixtures thereof;

wherein each $R^1$ and $R^2$ is independently selected from —H and —$CH_3$;

wherein the index m is 0 or 1;

wherein G, if present, is a divalent moiety $C_nH_{2n}$, where n is 1, 2, or 3;

wherein the index p is 0 or 1, with the proviso that when m is 0, p is 0;

wherein Q and each Q' is independently selected from —O— and —NH—, wherein no more than two Q' is —NH—;

wherein the index b is 0 or 1;

wherein L, if present, is at the terminus of a block of the ($C_2H_3R^2Q'$) units or between two ($C_2H_3R^2Q'$) units, and is a divalent organic linking moiety with molecular weight from 15 to 300 Da;

wherein the index q is 3 to 12;

wherein $R^3$ is selected from H, $C_1$-$C_4$ alkyl, or an independently selected A group; and wherein when $R^3$ is H, no more than five of $R^2$ on any compound are H, and wherein when $R^3$ is $C_1$-$C_4$ alkyl or A, q is at least 4, and at least four of $R^2$ are H, with the proviso that when the A group is Formula III and both $R^1$ of the A group are H, at least one of $R^2$ must be —$CH_3$; wherein the antioxidant according to Formula I comprises an A group according to Formula III.

17. A fabric treatment composition comprising:

a treatment adjunct material, and from about 0.001% to about 5.0%, by weight of the composition, of an antioxidant according to Formula I:

(Formula I)

$$A—Q[(L)_b(C_2H_3R^2Q')_q]R^3$$

wherein A is (Formula IV)

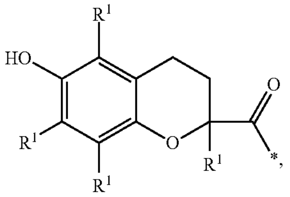

and wherein each $R^1$ and $R^2$ is independently selected from —H and —$CH_3$;

wherein Q and each Q' is independently selected from —O— and —NH—, wherein no more than two Q' is —NH—;

wherein the index b is 0 or 1;

wherein L, if present, is at the terminus of a block of the ($C_2H_3R^2Q'$) units or between two ($C_2H_3R^2Q'$) units, and is a divalent organic linking moiety with molecular weight from 15 to 300 Da;

wherein the index q is 3 to 12;

wherein $R^3$ is selected from H, $C_1$-$C_4$ alkyl, or an independently selected A group; and wherein when $R^3$ is H, no more than five of $R^2$ on any compound are H, and wherein when $R^3$ is $C_1$-$C_4$ alkyl or A, q is at least 4, and at least four of $R^2$ are H.

18. A fabric treatment composition comprising:

a treatment adjunct material, and from about 0.001% to about 5.0%, by weight of the composition, of an antioxidant according to Formula I:

(Formula I)

$$A—Q[(L)_b(C_2H_3R^2Q')_q]R^3$$

wherein A is selected from the group consisting of:

(Formula II)

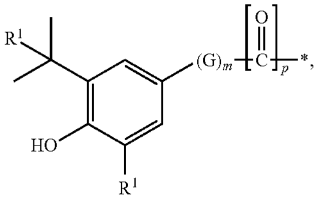

(i)

(Formula III)

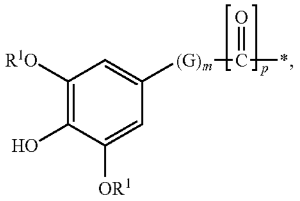

(ii)

(Formula IV)

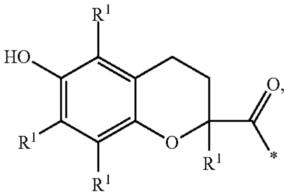

(iii)

and (iv) mixtures thereof;

wherein each $R^1$ and $R^2$ is independently selected from —H and —$CH_3$;

wherein the index m is 0 or 1;

wherein G, if present, is a divalent moiety $C_nH_{2n}$, where n is 1, 2, or 3;

wherein the index p is 0 or 1, with the proviso that when m is 0, p is 0;

wherein Q and each Q' is independently selected from —O— and —NH—, wherein no more than two Q' is —NH—;

wherein the index b is 0 or 1;

wherein L, if present, is at the terminus of a block of the ($C_2H_3R^2Q'$) units or between two ($C_2H_3R^2Q'$) units, and is a divalent organic linking moiety with molecular weight from 15 to 300 Da;

wherein the index q is 3 to 12;

wherein $R^3$ is selected from H, $C_1$-$C_4$ alkyl, or an independently selected A group; and wherein when $R^3$ is H, no more than five of $R^2$ on any compound are H, and wherein when $R^3$ is $C_1$-$C_4$ alkyl or A, q is at least 4, and at least four of $R^2$ are H, with the proviso that when the A group is Formula III and both $R^1$ of the A group are H, at least one of $R^2$ must be —$CH_3$;

wherein the composition comprises at least three distinct compounds that are antioxidants according to Formula I, optionally wherein each of the at least three distinct compounds is characterized by a molecular weight that is different from the molecular weights of the other distinct compounds.

19. A fabric treatment composition according to claim 1, wherein the antioxidant is characterized by a water solubility of from about 0.1 mg/L to about 5.0 g/L, as determined according to OECD Guideline 105.

* * * * *